US012327472B2

(12) United States Patent
Kim et al.

(10) Patent No.: US 12,327,472 B2
(45) Date of Patent: Jun. 10, 2025

(54) APPARATUS FOR PREDICTING TRAFFIC FLOW ON NEW ROAD AND METHOD THEREOF

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Nam Hyuk Kim, Seoul (KR); Sang Wook Kim, Seoul (KR); Dong Kyu Chae, Seoul (KR)

(73) Assignees: HYUNDAI MOTOR COMPANY, Seoul (KR); KIA CORPORATION, Seoul (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 232 days.

(21) Appl. No.: 18/170,665

(22) Filed: Feb. 17, 2023

(65) Prior Publication Data

US 2024/0135805 A1 Apr. 25, 2024

(30) Foreign Application Priority Data

Oct. 12, 2022 (KR) ........................ 10-2022-0130687

(51) Int. Cl.
*G08G 1/01* (2006.01)
*G08G 1/052* (2006.01)

(52) U.S. Cl.
CPC ........... *G08G 1/0125* (2013.01); *G08G 1/052* (2013.01)

(58) Field of Classification Search
CPC ............................. G08G 1/0125; G08G 1/052
See application file for complete search history.

(56) References Cited

U.S. PATENT DOCUMENTS

| | | | | |
|---|---|---|---|---|
| 11,087,215 | B1 * | 8/2021 | Chen | G06N 3/08 |
| 2012/0054145 | A1 * | 3/2012 | Suzuki | G06N 5/04 706/52 |
| 2020/0180647 | A1 * | 6/2020 | Anthony | G08G 1/0125 |
| 2022/0180737 | A1 | 6/2022 | Kim | |

(Continued)

FOREIGN PATENT DOCUMENTS

| | | | | | |
|---|---|---|---|---|---|
| CN | 111583648 | A * | 8/2020 | G06F 18/251 |
| KR | 20220081208 | A | 6/2022 | |
| KR | 20230134915 | A | 9/2023 | |

OTHER PUBLICATIONS

Machine Translation of Cai's reference (CN-111583648-A) (Year: 2020).*

(Continued)

*Primary Examiner* — Tarek Elarabi
(74) *Attorney, Agent, or Firm* — SLATER MATSIL, LLP

(57) ABSTRACT

An embodiment apparatus for predicting traffic flow on a new road includes a memory, an input device, and a controller configured to input traffic data corresponding to a default context of the new road received by the input device to a prediction model stored in the memory, training of which is completed, and to predict a traffic flow corresponding to various contexts of the new road based on the prediction model.

17 Claims, 15 Drawing Sheets

(56) References Cited

U.S. PATENT DOCUMENTS

2023/0298461 A1 9/2023 Kim

OTHER PUBLICATIONS

Zhang et al., "The Impact of Urban Layout on Traffic Flow Prediction of Intersection", 2010, DOI: 10.1109/ICIE.2010.258 (Year: 2010).*

Kim, N., et al., "Context-aware Traffic Flow Forecasting in New Roads," Proceedings of the 31st ACM International Conference on Information & Knowledge Management (CIKM '22), Oct. 17-21, 2022, Atlanta, GA, USA, 5 pages.

* cited by examiner

| Metrics / Methods | MAE(mean absolute error) | | | RMSE (root mean square error) | | | MAPE(mean absolute percentage error) | | |
|---|---|---|---|---|---|---|---|---|---|
| | Proposed | Baseline | Improv. | Proposed | Baseline | Improv. | Proposed | Baseline | Improv. |
| Sunny & weekday & summer | 7.49 | 14.47 | 48.26% | 10.96 | 18.73 | 41.50% | 0.2407 | 0.4750 | 49.33% |
| Sunny & after holiday & summer | 8.40 | 14.70 | 42.85% | 12.15 | 18.93 | 35.82% | 0.2268 | 0.4480 | 49.38% |
| Sunny & weekday & autumn | 8.36 | 13.93 | 39.96% | 12.28 | 17.82 | 31.07% | 0.2619 | 0.4353 | 39.83% |
| Rainy & before holiday & autumn | 11.69 | 14.44 | 19.07% | 15.81 | 18.61 | 15.02% | 0.5469 | 0.6794 | 19.51% |
| Sunny & holiday (weekend) & autumn | 12.08 | 16.83 | 28.22% | 17.17 | 21.29 | 19.38% | 0.5435 | 0.5906 | 7.97% |
| Sunny & holiday (holiday season) & autumn | 8.05 | 14.24 | 43.46% | 11.66 | 17.72 | 34.20% | 0.2075 | 0.3049 | 31.95% |
| Average | 9.35 | 14.77 | 36.97% | 13.34 | 18.85 | 29.50% | 0.3379 | 0.4889 | 32.99% |

FIG.5A

| Metrics / Methods | MAE(mean absolute error) | | | RMSE (root mean square error) | | | MAPE(mean absolute percentage error) | | |
|---|---|---|---|---|---|---|---|---|---|
| | Proposed | Baseline | Improv. | Proposed | Baseline | Improv. | Proposed | Baseline | Improv. |
| Sunny & weekday & spring | 9.61 | 13.93 | 30.98% | 13.97 | 17.84 | 21.71% | 0.2754 | 0.3949 | 30.27% |
| Sunny & holiday (weekend) & spring | 8.51 | 13.05 | 34.80% | 11.30 | 15.44 | 26.78% | 0.1496 | 0.2514 | 40.49% |
| Sunny & holiday (holiday season) & spring | 9.29 | 13.79 | 32.67% | 12.79 | 16.92 | 24.41% | 0.2029 | 0.2861 | 29.06% |
| Rainy & holiday (weekend) & spring | 8.07 | 12.68 | 36.34% | 10.91 | 15.49 | 29.53% | 0.1683 | 0.2759 | 39.01% |
| Snowy & weekday & winter | 10.97 | 14.30 | 23.30% | 15.58 | 18.56 | 16.05% | 0.3687 | 0.5380 | 31.47% |
| Snowy and rainy (sleet) & weekday & winter | 10.24 | 14.11 | 27.44% | 13.96 | 18.04 | 22.62% | 0.2909 | 0.4493 | 35.25% |
| Average | 9.45 | 13.64 | 30.92% | 13.09 | 17.05 | 23.52% | 0.2426 | 0.3659 | 34.26% |

FIG.5B

APPARATUS FOR PREDICTING TRAFFIC FLOW ON NEW ROAD AND METHOD THEREOF

CROSS-REFERENCE TO RELATED APPLICATIONS

This application claims the benefit of Korean Patent Application No. 10-2022-0130687, filed on Oct. 12, 2022, which application is hereby incorporated herein by reference.

TECHNICAL FIELD

The present disclosure relates to technologies of predicting traffic flow on a newly constructed road.

BACKGROUND

In general, the artificial neural network (ANN) is one field of artificial intelligence, which is an algorithm allowing a machine to simulate and learn the human neural structure. Recently, the ANN has been applied to image recognition, speed recognition, natural language processing, and the like to show excellent effects. The ANN is composed of an input layer for receiving an input, a hidden layer for actually performing learning, and an output layer for returning the result of calculation. A plurality of hidden layers are referred to as a deep neural network (DNN). The DNN is a kind of ANN.

The ANN allows a computer to learn on its own based on data. When solving a certain problem using the ANN, what needs to be prepared is an appropriate ANN model and data to be analyzed. An ANN model for solving a problem is learned based on data. Prior to learning the model, there is a need for a work of dividing data into two types. In other words, data should be divided into a train dataset and a validation dataset. The train dataset is used to train the model, and the validation dataset is used to validate performance of the model.

There are several reasons for validating an ANN model. An ANN developer corrects a hyper parameter of the model based on the result of validating the model to tune the model. Furthermore, the model is validated to select which model is suitable among several models. A description will be given in detail of the reason why model validation is necessary.

First, it is to predict accuracy. The purpose of the ANN is to achieve good performance on out-of-sample data which is not used for training. Therefore, after creating the model, it is essential to verify how well the model will perform on out-of-sample data. However, because the model should not be validated using the train dataset, accuracy of the model should be measured using the validation dataset independent of the train dataset.

Secondly, the model is tuned to enhance performance of the model. For example, overfitting may be prevented. The overfitting refers to when the model is overtrained on the train dataset. As an example, when training accuracy is high and when validation accuracy is low, the possibility of overfitting may be suspected. This may be identified in detail by means of a training loss and a validation loss. When the overfitting occurs, it should be prevented to enhance accuracy of validation. The overfitting may be prevented using a method such as regularization and dropout.

Meanwhile, an existing technology, which predicts traffic flow on the road, trains a prediction model using traffic data (historical traffic data) corresponding to various contexts of the road and predicts future traffic flow on the road (e.g., an average speed for each section of the road) based on the prediction model, the training of which is completed.

However, for a new road, because it takes a lot of time to collect traffic data corresponding to various contexts (e.g., weather conditions (rain and snow), day types (e.g., a weekday, a weekend, a holiday, a day before the holiday, and a day after the holiday), and seasons (spring, summer, autumn, and winter)), a prediction model which does not train the traffic data corresponding to the various contexts may not accurately predict the traffic flow on the new road.

As a result, the existing technology may not predict the traffic flow on the new road where it is unable to collect historical traffic data.

Details described in the background art are written to increase the understanding of the background of embodiments of the present disclosure, which may include details rather than an existing technology well known to those skilled in the art.

SUMMARY

Embodiments of the present disclosure can solve problems occurring in the prior art while advantages achieved by the prior art are maintained intact.

An embodiment of the present disclosure provides an apparatus for predicting traffic flow on a new road to train a prediction model using traffic data corresponding to various contexts of an existing road and input traffic data corresponding to a default context (e.g., a sunny weekday) of the new road to the prediction model, the training of which is completed, to predict traffic flow corresponding to various contexts of the new road to predict traffic flow for the new road where it is unable to collect historical traffic data and a method thereof.

Another embodiment of the present disclosure provides an apparatus for predicting traffic flow on a new road to generate a conditional generative adversarial network (CGAN)-based prediction model which trains a subtle pattern of a change in traffic flow according to various contextual factors and a method thereof.

Another embodiment of the present disclosure provides an apparatus for predicting traffic flow on a new road to train CGAN to capture a subtle pattern of how the traffic flow of the road changes in conjunction with various contexts, using sufficient traffic data of an existing road and a method thereof.

Another embodiment of the present disclosure provides an apparatus for predicting traffic flow on a new road to train CGAN using traffic data corresponding to various contexts of an existing road and input traffic data corresponding to a default context of the new road to the CGAN, the training of which is completed, to predict traffic flow corresponding to various contexts of the new road and a method thereof.

Another embodiment of the present disclosure provides an apparatus for predicting traffic flow on a new road to train CGAN using traffic data corresponding to various contexts of an existing road and input traffic data on a sunny weekday on the new road to the CGAN, the training of which is completed, to predict traffic flow on a rainy holiday on the new road and a method thereof.

The embodiments of the present disclosure are not limited to the aforementioned embodiments, and any other embodiments and advantages not mentioned herein will be clearly understood from the following description and may be more clearly known by described embodiments of the present disclosure. Furthermore, it may be easily seen that purposes and advantages of embodiments of the present disclosure may be implemented by means indicated in the claims and a combination thereof.

According to an embodiment of the present disclosure, an apparatus may include a memory storing a prediction model, training of which is completed, an input device that receives traffic data corresponding to a default context of the new road, and a controller that inputs the traffic data corresponding to the default context of the new road to the prediction model and predicts traffic flow corresponding to various contexts of the new road based on the prediction model.

In an embodiment of the present disclosure, the input device may further receive traffic data corresponding to various contexts of an existing road.

In an embodiment of the present disclosure, the controller may train the prediction model to capture a pattern of how traffic flow of the existing road changes in conjunction with the various contexts of the existing road.

In an embodiment of the present disclosure, the controller may control the prediction model to train a change pattern of traffic data according to a context based on first training data and second training data, when the input device receives the first training data including first traffic data corresponding to a first context and the second training data including second traffic data corresponding to a second context.

In an embodiment of the present disclosure, the prediction model may train the change pattern of the traffic data according to the context, in a process of generating fake data including the first traffic data corresponding to the second context.

In an embodiment of the present disclosure, the controller may control an auxiliary loss function of the prediction model to generate the first traffic data in which a unique characteristic of the second context is reflected.

In an embodiment of the present disclosure, the controller may control a reconstruction loss function of the prediction model to generate the fake data similar to real data.

In an embodiment of the present disclosure, the various contexts may include at least one of rain and snow as weather conditions, a weekday, a weekend, a holiday, a day before the holiday, and a day after the holiday as day types, spring, summer, autumn, and winter as seasons, or a combination thereof.

In an embodiment of the present disclosure, the traffic data may be an average of vehicle speeds recorded at intervals of a predetermined time.

In an embodiment of the present disclosure, the prediction model may be a conditional generative adversarial network (CGAN).

According to another embodiment of the present disclosure, a method may include storing, by a memory, a prediction model, training of which is completed, receiving, by an input device, traffic data corresponding to a default context of the new road, and inputting, by a controller, the traffic data corresponding to the default context of the new road to the prediction model and predicting, by the controller, traffic flow corresponding to various contexts of the new road based on the prediction model.

In an embodiment of the present disclosure, the method may further include receiving, by the input device, traffic data corresponding to various contexts of an existing road.

In an embodiment of the present disclosure, the method may further include training, by the controller, the prediction model to capture a pattern of how traffic flow of the existing road changes in conjunction with the various contexts of the existing road.

In an embodiment of the present disclosure, the method may further include controlling, by the controller, the prediction model to train a change pattern of traffic data according to a context based on first training data and second training data, when the input device receives the first training data including first traffic data corresponding to a first context and the second training data including second traffic data corresponding to a second context.

In an embodiment of the present disclosure, the controlling of the prediction model may include training the change pattern of the traffic data according to the context, in a process where the prediction model generates fake data including the first traffic data corresponding to the second context.

In an embodiment of the present disclosure, the training of the change pattern of the traffic data according to the context may include controlling, by the controller, an auxiliary loss function of the prediction model to generate the first traffic data in which a unique characteristic of the second context is reflected.

In an embodiment of the present disclosure, the training of the change pattern of the traffic data according to the context may include controlling, by the controller, a reconstruction loss function of the prediction model to generate the fake data similar to real data.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 5A is a drawing of an example indicating a quantitative analysis of performance of an apparatus for predicting traffic flow on a new road according to an embodiment of the present disclosure;

FIG. 5B is a drawing of another example indicating a quantitative analysis of performance of an apparatus for predicting traffic flow on a new road according to an embodiment of the present disclosure;

DETAILED DESCRIPTION OF ILLUSTRATIVE EMBODIMENTS

Figure 1:
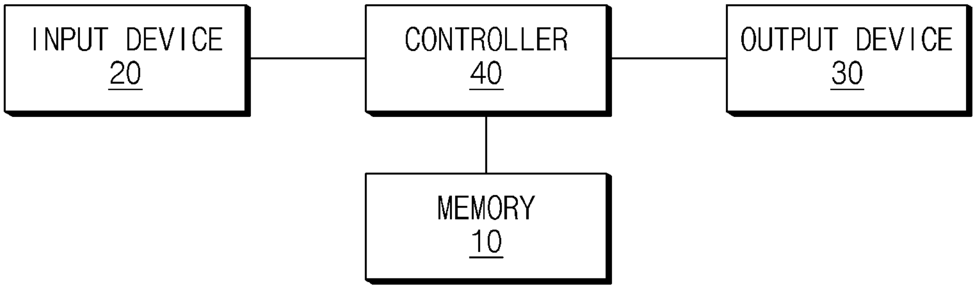
FIG. 1 is a block diagram illustrating a configuration of an apparatus for predicting traffic flow on a new road according to an embodiment of the present disclosure.

Hereinafter, some embodiments of the present disclosure will be described in detail with reference to the accompanying drawings. In adding the reference numerals to the components of each drawing, it should be noted that the identical component is designated by the identical numeral even when it is displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, “A”, “B”, (a), (b), and the like may be used. These terms are merely intended to distinguish one component from another component, and the terms do not limit the nature, sequence, or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for predicting traffic flow on a new road according to an embodiment of the present disclosure.

As shown in FIG. 1, the apparatus for predicting the traffic flow on the new road according to an embodiment of the present disclosure may include a memory (i.e., a storage) 10, an input device 20, an output device 30, and a controller 40. In this case, the respective components may be combined into one component and some components may be omitted, depending on a manner which executes the apparatus for predicting the traffic flow on the new road according to an embodiment of the present disclosure.

Seeing the respective components, first of all, the memory 10 may store various logic, algorithms, and programs required in a process of training a prediction model using traffic data corresponding to various contexts of existing roads, inputting traffic data corresponding to a default context (e.g., a sunny weekday) of a new road to the prediction model, the training of which is completed, and predicting traffic flow corresponding to the various contexts of the new road.

The memory 10 may store a conditional generative adversarial network (CGAN) as a prediction model.

The memory 10 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

Figure 2:
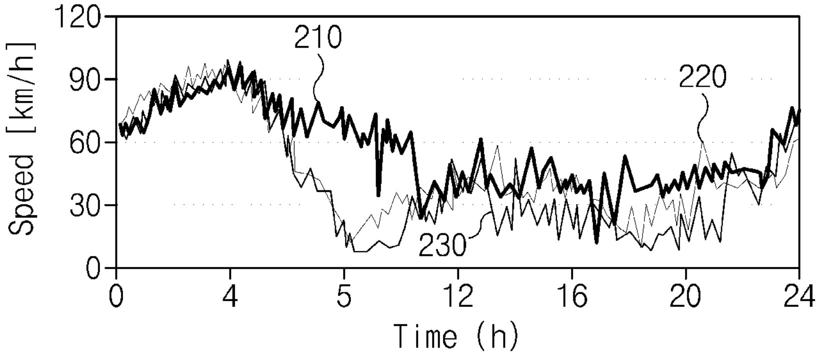
FIG. 2 is a drawing of an example of traffic data corresponding to various contexts of existing roads, which is received by an input device provided in an apparatus for predicting traffic flow on a new road according to an embodiment of the present disclosure.

The input device 20 may receive traffic data corresponding to the default context of the new road or traffic data corresponding to various contexts of existing roads as shown in FIG. 2. Herein, the various contexts may include, for example, weather conditions (e.g., rain and snow), day types (e.g., a weekday, a weekend, a holiday, a day before the holiday, and a day after the holiday), and seasons (e.g., spring, summer, autumn, and winter), and the default context may include, for example, a sunny weekday. The traffic data may include an average of vehicle speeds recorded at intervals of a predetermined time (e.g., 5 minutes).

FIG. 2 is a drawing of an example of traffic data corresponding to various contexts of existing roads, which is received by an input device provided in an apparatus for predicting traffic flow on a new road according to an embodiment of the present disclosure.

In a graph shown in FIG. 2, the horizontal axis indicates time, the vertical axis indicates speed, reference numeral 210 indicates the traffic data for each time zone of a sunny weekend on the existing roads, reference numeral 220 indicates the traffic data for each time zone of the sunny weekday on the existing roads, and reference numeral 230 indicates the traffic data for each time zone of the rainy weekday on the existing roads. Herein, the existing roads refer to random roads where pieces of traffic data corresponding to various contexts are able to be obtained.

FIG. 2 illustrates total traffic data for one day. However, traffic data actually received in an input device 20 of FIG. 1 may be training instances derived from the graph of FIG. 2.

An output device 30 of FIG. 1 may output traffic flow on a new road, which is predicted by a controller 40 of FIG. 1, as an image or a voice. To this end, the output device 30 may include a display module and a sound output module.

Such a display module may display (or output) information processed by a multimedia system for a vehicle. For example, when the multimedia system for the vehicle is in a navigation mode, the display module may display a map associated with a current location, a destination, a route, or the like in conjunction with driving of the vehicle and may display a user interface (UI) or a graphic user interface (GUI) associated with a speed, a direction, a distance indication, or the like. When the multimedia system for the vehicle is in a black box mode or an image capture mode, the display module may display a captured image, a UI, or a GUI.

Furthermore, the display module may include at least one of a liquid crystal display (LCD), a thin film transistor-LCD (TFT-LCD), an organic light-emitting diode (OLED) display, a flexible display, or a three-dimensional (3D) display.

When the display module and the touch sensor make up a mutual layer structure (hereinafter referred to as a "touch screen"), the display module may be used as an input device other than an output device.

The sound output module may output audio data in a multimedia file playback mode or a broadcasting receiving mode or may output audio data stored in a memory. The sound output module may output an acoustic signal associated with a function (e.g., a warning sound, a notification sound, a route guidance voice, or the like) performed by the multimedia system for vehicle. Such a sound output module may include a receiver, a speaker, a buzzer, or the like.

The controller 40 may perform the overall control such that respective components may normally perform their own functions. Such a controller 40 may be implemented in the form of hardware, may be implemented in the form of software, or may be implemented in the form of a combination thereof. Preferably, the controller 40 may be implemented as, but is not limited to, a microprocessor.

Particularly, the controller 40 may perform a variety of controls in a process of training a prediction model using traffic data corresponding to various contexts of existing roads, inputting traffic data corresponding to a default context (e.g., a sunny weekday) of a new road to the prediction model, the training of which is completed, and predicting traffic flow corresponding to the various contexts of the new road. Hereinafter, the operation of the controller 40 will be described in detail with reference to FIG. 3.

Figure 3:
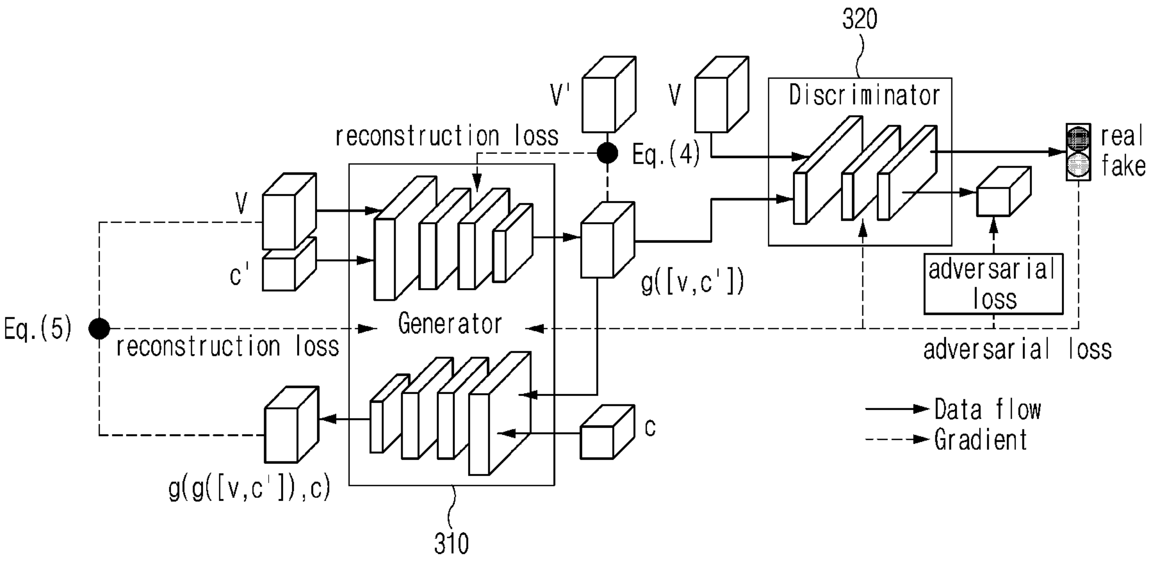
FIG. 3 is a drawing of an example indicating a structure of a prediction model provided in an apparatus for predicting traffic flow on a new road according to an embodiment of the present disclosure.

FIG. 3 is a drawing of an example indicating a structure of a prediction model provided in an apparatus for predicting traffic flow on a new road according to an embodiment of the present disclosure.

As shown in FIG. 3, the prediction model provided in the apparatus for predicting the traffic flow on the new road according to an embodiment of the present disclosure may be implemented as, for example, a conditional generative adversarial network (CGAN). Such CGAN may include a generator 310 and a discriminator 320. Furthermore, a controller 40 of FIG. 1 may set values such as Table 1 below in the process of training the CGAN.

TABLE 1

| Hyper-parameter | Value |
|---|---|
| epoch | 100000 |
| batch_size | 64 |
| n_critic | 2.0 |
| D_lr | 0.0005 |
| G_lr | 0.0005 |
| D_layers | 3 |
| G_layers | 3 |

Herein, "epoch" indicates the number of times that the full training dataset passes through the CGAN. For example, when "epoch" is 1, it means that the full training dataset is applied to one neural network and passes through the CGAN once through forward propagation and back propagation.

Furthermore, "batch_size" indicates the number of data which belongs to one group, that is, the number of samples for a learning step, when the full training dataset is divided into a plurality of groups.

Furthermore, "n_critic" indicates a learning rate of the discriminator 320 and the generator 310. For example, when it is less than "1" with respect to the generator 310, it means that the discriminator 320 performs training more. When it is greater than "1" with respect to the generator 310, it means that the generator 310 performs training more.

Furthermore, "D_lr" indicates the learning rate of the discriminator 320, "G_lr" indicates the learning rate of the generator 310, "D_layers" indicates the number of layers of the discriminator 320, and "G_layers" indicates the number of layers of the generator 310.

Such CGAN may be trained by the controller 40. In other words, the controller 40 may train the CGAN to capture a subtle pattern of how traffic flow on the road changes in conjunction with various contexts.

For example, when receiving first training data (v, c) includes first traffic data v corresponding to a first context c and second training data (v', c') including second traffic data v' corresponding to a second context c', the controller 40 may control the CGAN to train a change pattern of traffic data according to a context based on the first training data (v, c) and the second training data (v', c'). In other words, the generator 310 may train the change pattern of the traffic data according to the context in a process of generating fake data G([v, c']) including the first traffic data v corresponding to the second context c'. At this time, the discriminator 320 may train the fake data generated by the generator 310 to be discriminated from the first training data. Herein, the first context c may be, for example, a "sunny weekday", and the second context c' may be a "rainy holiday".

In the process of training such CGAN, the controller 40 may train the CGAN to generate traffic data in which a unique characteristic of the target context c' is reflected. To this end, the controller 40 may set an auxiliary loss function such as Equation 1 below.

$$V_{aux}(D)=E_{v,c-Pdata}[-\log D_{aux}(c|v)]$$

$$V_{aux}(G)=E_{v,c'-Pdata}[-\log D_{aux}(c'|G(c'))] \quad \text{Equation 1}$$

Herein, $V_{aux}(D)$ indicates the auxiliary loss function set in the discriminator 320, and $V_{aux}$ (G) indicates the auxiliary loss function set in the generator 310.

Furthermore, the controller 40 may train the CGAN to generate traffic data corresponding to the target context while maintaining a unique characteristic of the road. To this end, the controller 40 may set a reconstruction loss function such as Equation 2 below. Such a reconstruction loss function may allow the generator 310 to generate fake data similar to real data.

$$V_{rec}^{c'}(G)=E_{v,c'-Pdata}[\|v'-G([v,c'])\|^2]$$

$$V_{rec}^{c}(G)=E_{v,c,c'-Pdata}[\|v-G([G([v,c']),c])\|^2] \quad \text{Equation 2}$$

Herein, $V_{rec}^{c'}(G)$ serves to reduce the difference between the second traffic data v' and the fake data G([v, c']), and $V_{rec}^{c}(G)$ serves to reduce the difference between G([G([v, c']), c]) in which the fake data G([v, c']) is conversely converted into the condition of the first context c and the first traffic data v.

A final objective function considering all of adversarial loss and L2 regularization, which are generally widely known, as well as the above-mentioned auxiliary loss and reconstruction loss is as in Equations 3 and 4 below. Herein, the L2 regularization may improve reliability of the CGAN, the training of which is completed. Furthermore, V(G) indicates the final objective function applied to the generator 310, and V(D) indicates the final objective function applied to the discriminator 320.

Equation 3

$$V(G) = -E_{v,c'\sim Pdata}[\ln D(G([v, c']))] + \alpha G \cdot V_{aux}(G) + \beta G \cdot ((V_{rec}^{c'}(G) + V_{rec}^{c}(G)) + \frac{\gamma G}{2} \cdot |\theta|^2$$

Herein, $-E_{v,c'\sim Pdata}[\ln D(G([v, c']))]$ indicates the adversarial loss, $\alpha G \cdot V_{aux}(G)$ indicates the auxiliary loss, $\beta G \cdot ((V_{rec}^{c'}(G)+V_{rec}^{c}(G))$ indicates the reconstruction loss, and $$\frac{\gamma G}{2} \cdot |\theta|^2$$

indicates the L2 regularization. Furthermore, α indicates the tunable parameter for controlling the auxiliary loss, β indicates the tunable parameter for controlling the reconstruction loss, γ indicates the tunable parameter for controlling the L2 regularization, and θ indicates the set of model parameters for G.

Equation 4

$$(D) = (-E_{v\sim Pdata(v)}[\ln D(v)] + E_{v,c'\sim Pdata}[\ln D(G([v, c']))]) + \alpha D \cdot V_{aux}(D) + \frac{\gamma D}{2} \cdot |\phi|^2$$

Herein, $(-E_{v\sim Pdata}(v)[\ln D(v)]+E_{v,c'\sim Pdata}[\ln D(G([v, c']))])$ indicates the adversarial loss, $\alpha D \cdot V_{aux}(D)$ indicates the auxiliary loss, and $$\frac{\gamma D}{2} \cdot |\phi|^2$$

indicates the L2 regularization. Furthermore, α indicates the tunable parameter for controlling the auxiliary loss, γ indicates the tunable parameter for controlling the L2 regularization, and ϕ indicates the set of model parameters for D.

Figure 4A:
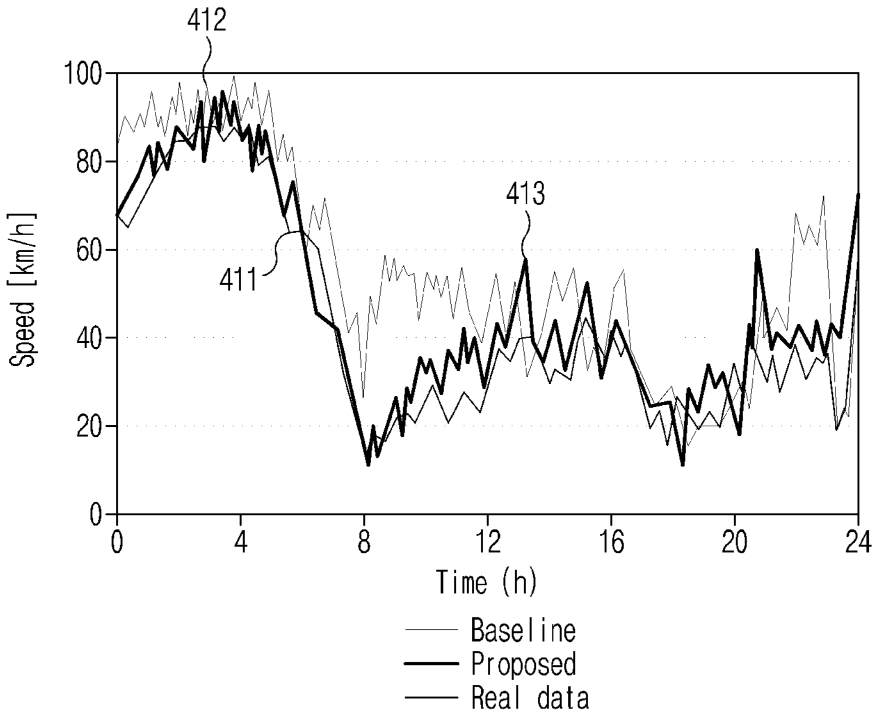
FIG. 4A is a drawing of an example indicating a qualitative analysis of performance of an apparatus for predicting traffic flow on a new road according to an embodiment of the present disclosure.

FIG. 4A is a drawing of an example indicating a qualitative analysis of performance of an apparatus for predicting traffic flow on a new road according to an embodiment of the present disclosure.

A graph shown in FIG. 4A illustrates the result of predicting traffic data corresponding to "a sunny weekday in summer (sunny & weekday & summer)" with respect to a new road in various schemes. Herein, reference numeral 411 indicates the real data, reference numeral 412 indicates the traffic data predicted by an existing scheme (e.g., baseline), and reference numeral 413 indicates the traffic data predicted by the apparatus for predicting the traffic flow on the new road according to an embodiment of the present disclosure.

It may be seen that the traffic data 413 predicted by the proposed scheme according to an embodiment of the present disclosure is more similar to the real data 411 than the traffic data 412 predicted by the existing scheme. For example, in conjunction with traffic flow around 9 a.m., the traffic data 413 predicted by the proposed scheme according to an embodiment of the present disclosure indicates that the road is congested (e.g., the vehicle speed is less than 20 km/h) to be similar to the real data 411, whereas the traffic data 412 predicted by the existing scheme indicates that the vehicle smoothly travels (e.g., the vehicle speed is 60 km/h) to be different from the real data 411. As a result, it may be seen that prediction accuracy according to the proposed scheme according to an embodiment of the present disclosure is higher than prediction accuracy according to the existing scheme.

Figure 4B:
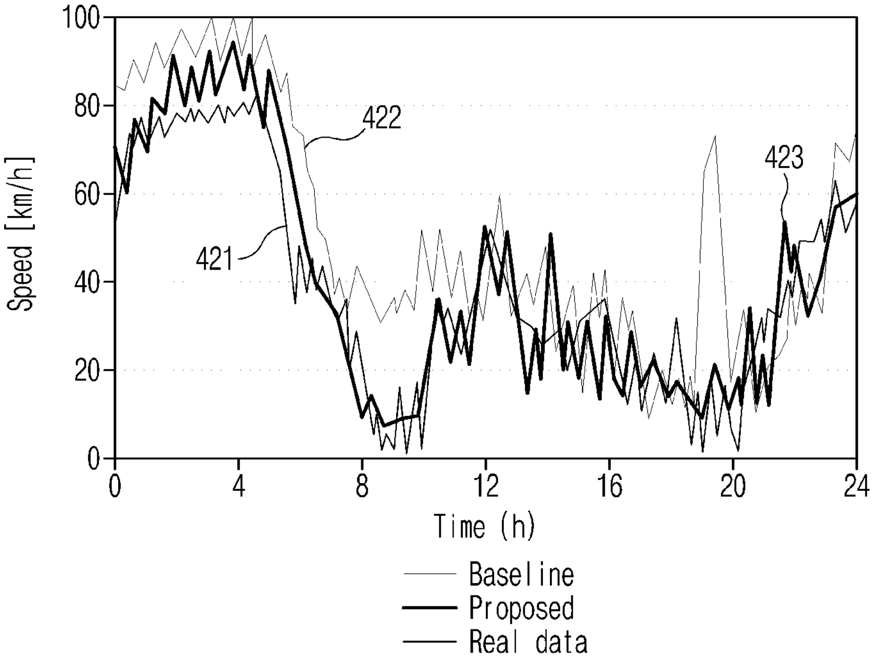
FIG. 4B is a drawing of another example indicating a qualitative analysis of performance of an apparatus for predicting traffic flow on a new road according to an embodiment of the present disclosure.

FIG. 4B is a drawing of another example indicating a qualitative analysis of performance of an apparatus for predicting traffic flow on a new road according to an embodiment of the present disclosure.

A graph shown in FIG. 4B illustrates the result of predicting traffic data corresponding to "a day before a rainy holiday in autumn (rainy & before holiday & autumn)" with respect to a new road in various schemes. Herein, reference numeral 421 indicates the real data, reference numeral 422 indicates the traffic data predicted by an existing scheme (e.g., baseline), and reference numeral 423 indicates the traffic data predicted by the apparatus for predicting the traffic flow on the new road according to an embodiment of the present disclosure.

It may be seen that the traffic data 423 predicted by the proposed scheme according to an embodiment of the present disclosure is more similar to the real data 421 than the traffic data 422 predicted by the existing scheme. For example, in conjunction with traffic flow from 9 a.m. to 11 a.m., the traffic data 423 predicted by the proposed scheme according to an embodiment of the present disclosure indicates that the road is congested (e.g., the vehicle speed is less than 5 km/h) to be similar to the real data 421, whereas the traffic data 422 predicted by the existing scheme indicates that the vehicle slowly travels (e.g., the vehicle speed is 40 km/h) to be different from the real data 421. As a result, it may be seen that prediction accuracy according to the proposed scheme according to an embodiment of the present disclosure is higher than prediction accuracy according to the existing scheme.

Figure 4C:
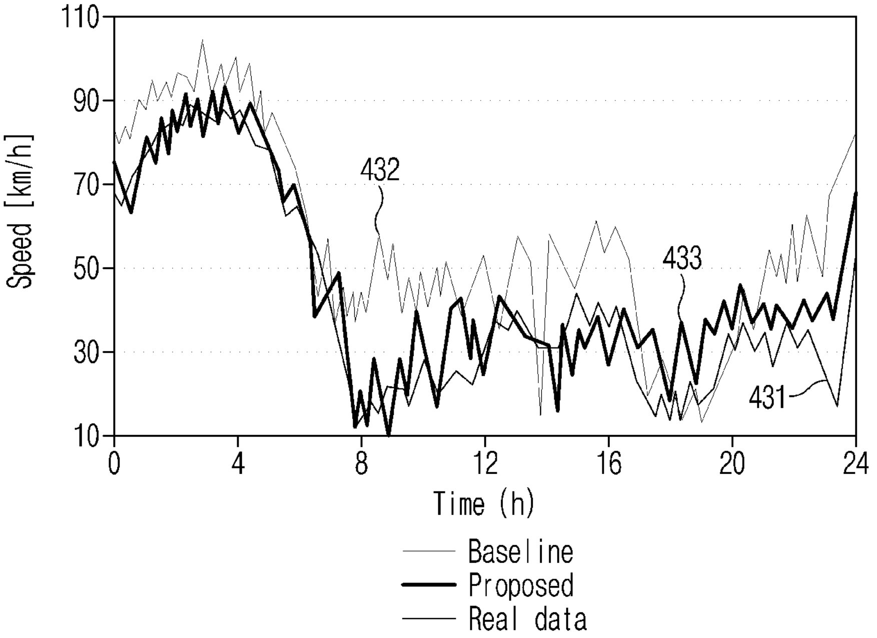
FIG. 4C is a drawing of another example indicating a qualitative analysis of performance of an apparatus for predicting traffic flow on a new road according to an embodiment of the present disclosure.

FIG. 4C is a drawing of another example indicating a qualitative analysis of performance of an apparatus for predicting traffic flow on a new road according to an embodiment of the present disclosure.

A graph shown in FIG. 4C illustrates the result of predicting traffic data corresponding to "a sunny weekday in autumn (sunny & weekday & autumn)" with respect to a new road in various schemes. Herein, reference numeral 431 indicates the real data, reference numeral 432 indicates the traffic data predicted by an existing scheme (e.g., baseline), and reference numeral 433 indicates the traffic data predicted by the apparatus for predicting the traffic flow on the new road according to an embodiment of the present disclosure.

It may be seen that the traffic data 433 predicted by the proposed scheme according to an embodiment of the present disclosure is more similar to the real data 431 than the traffic data 432 predicted by the existing scheme. For example, in conjunction with traffic flow from 9 a.m. to 10 a.m., the traffic data 433 predicted by the proposed scheme according to an embodiment of the present disclosure indicates that the road is congested (e.g., the vehicle speed is less than 20 km/h) to be similar to the real data 431, whereas the traffic data 432 predicted by the existing scheme indicates that the vehicle slowly travels (e.g., the vehicle speed is 50 km/h) to be different from the real data 431. As a result, it may be seen that prediction accuracy according to the proposed scheme according to an embodiment of the present disclosure is higher than prediction accuracy according to the existing scheme.

Figure 4D:
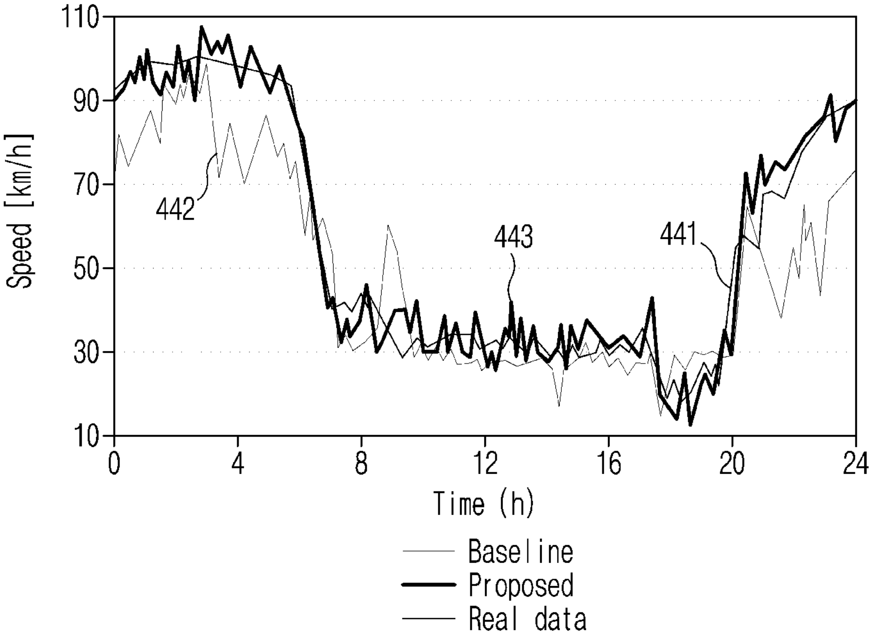
FIG. 4D is a drawing of another example indicating a qualitative analysis of performance of an apparatus for predicting traffic flow on a new road according to an embodiment of the present disclosure.

FIG. 4D is a drawing of another example indicating a qualitative analysis of performance of an apparatus for predicting traffic flow on a new road according to an embodiment of the present disclosure.

A graph shown in FIG. 4D illustrates the result of predicting traffic data corresponding to "a day before a sunny holiday in autumn (sunny & before holiday & autumn)" with respect to a new road in various schemes. Herein, reference numeral 441 indicates the real data, reference numeral 442 indicates the traffic data predicted by an existing scheme (e.g., baseline), and reference numeral 443 indicates the traffic data predicted by the apparatus for predicting the traffic flow on the new road according to an embodiment of the present disclosure.

It may be seen that the traffic data 443 predicted by the proposed scheme according to an embodiment of the present disclosure is more similar to the real data 441 than the traffic data 442 predicted by the existing scheme. For example, in conjunction with traffic flow around 10 a.m., the traffic data 443 predicted by the proposed scheme according to an embodiment of the present disclosure indicates that the vehicle slowly travels (e.g., the vehicle speed is less than 40 km/h) to be similar to the real data 441, whereas the traffic data 442 predicted by the existing scheme indicates that the vehicle smoothly travels (e.g., the vehicle speed is 60 km/h) to be different from the real data 441. As a result, it may be seen that prediction accuracy according to the proposed scheme according to an embodiment of the present disclosure is higher than prediction accuracy according to the existing scheme.

Figure 4E:
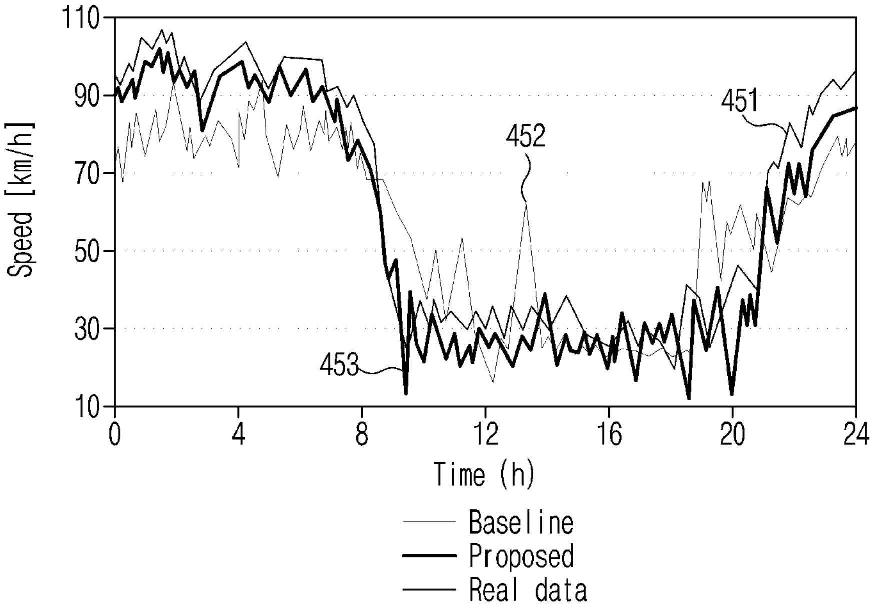
FIG. 4E is a drawing of another example indicating a qualitative analysis of performance of an apparatus for predicting traffic flow on a new road according to an embodiment of the present disclosure.

FIG. 4E is a drawing of another example indicating a qualitative analysis of performance of an apparatus for predicting traffic flow on a new road according to an embodiment of the present disclosure.

A graph shown in FIG. 4E illustrates the result of predicting traffic data corresponding to "a rainy holiday in spring (rainy & holiday & spring)" with respect to a new road in various schemes. Herein, reference numeral 451 indicates the real data, reference numeral 452 indicates the traffic data predicted by an existing scheme (e.g., baseline), and reference numeral 453 indicates the traffic data predicted by the apparatus for predicting the traffic flow on the new road according to an embodiment of the present disclosure.

It may be seen that the traffic data 453 predicted by the proposed scheme according to an embodiment of the present disclosure is more similar to the real data 451 than the traffic data 452 predicted by the existing scheme. For example, in conjunction with traffic flow around 3 p.m., the traffic data 453 predicted by the proposed scheme according to an embodiment of the present disclosure indicates that the vehicle slowly travels (e.g., the vehicle speed is less than 30 km/h) to be similar to the real data 451, whereas the traffic data 452 predicted by the existing scheme indicates that the vehicle smoothly travels (e.g., the vehicle speed is 60 km/h) to be different from the real data 451. As a result, it may be seen that prediction accuracy according to the proposed scheme according to an embodiment of the present disclosure is higher than prediction accuracy according to the existing scheme.

Figure 4F:
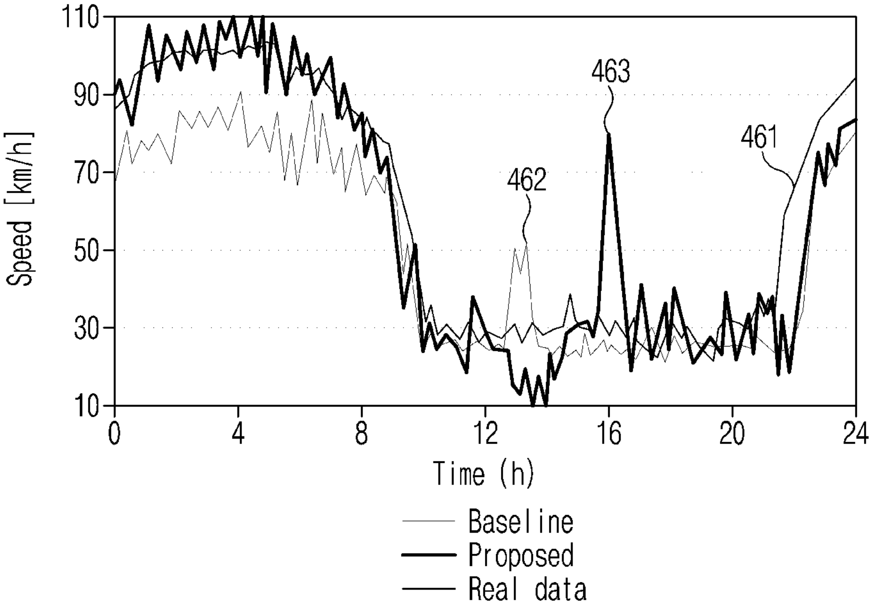
FIG. 4F is a drawing of another example indicating a qualitative analysis of performance of an apparatus for predicting traffic flow on a new road according to an embodiment of the present disclosure.

FIG. 4F is a drawing of another example indicating a qualitative analysis of performance of an apparatus for predicting traffic flow on a new road according to an embodiment of the present disclosure.

A graph shown in FIG. 4F illustrates the result of predicting traffic data corresponding to "a sunny holiday in summer (sunny & holiday & summer)" with respect to a new road in various schemes. Herein, reference numeral 461 indicates the real data, reference numeral 462 indicates the traffic data predicted by an existing scheme (e.g., baseline), and reference numeral 463 indicates the traffic data predicted by the apparatus for predicting the traffic flow on the new road according to an embodiment of the present disclosure.

It may be seen that the traffic data 463 predicted by the proposed scheme according to an embodiment of the present disclosure is more similar to the real data 461 than the traffic data 462 predicted by the existing scheme. For example, in conjunction with traffic flow around 4 a.m., the traffic data 463 predicted by the proposed scheme according to an embodiment of the present disclosure indicates that the vehicle travels at a high speed (e.g., the vehicle speed is greater than or equal to 100 km/h) to be similar to the real data 461, whereas the traffic data 462 predicted by the existing scheme indicates that the vehicle smoothly travels (e.g., the vehicle speed is 80 km/h) to be different from the real data 461. As a result, it may be seen that prediction accuracy according to the proposed scheme according to an embodiment of the present disclosure is higher than prediction accuracy according to the existing scheme.

Figure 4G:
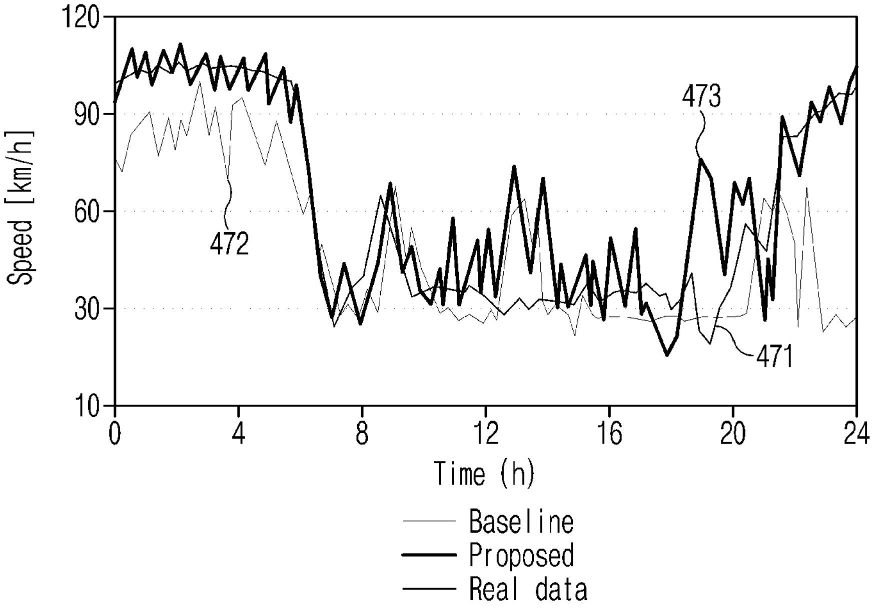
FIG. 4G is a drawing of another example indicating a qualitative analysis of performance of an apparatus for predicting traffic flow on a new road according to an embodiment of the present disclosure.

FIG. 4G is a drawing of another example indicating a qualitative analysis of performance of an apparatus for predicting traffic flow on a new road according to an embodiment of the present disclosure.

A graph shown in FIG. 4G illustrates the result of predicting traffic data corresponding to "a snowy weekday in winter (snowy & weekday & winter)" with respect to a new road in various schemes. Herein, reference numeral 471 indicates the real data, reference numeral 472 indicates the traffic data predicted by an existing scheme (e.g., baseline), and reference numeral 473 indicates the traffic data predicted by the apparatus for predicting the traffic flow on the new road according to an embodiment of the present disclosure.

It may be seen that the traffic data 473 predicted by the proposed scheme according to an embodiment of the present disclosure is more similar to the real data 471 than the traffic data 472 predicted by the existing scheme. For example, in conjunction with traffic flow around 4 a.m., the traffic data 473 predicted by the proposed scheme according to an embodiment of the present disclosure indicates that the vehicle travels at a high speed (e.g., the vehicle speed is greater than or equal to 110 km/h) to be similar to the real data 471, whereas the traffic data 472 predicted by the existing scheme indicates that the vehicle smoothly travels (e.g., the vehicle speed is 80 km/h) to be different from the real data 471. As a result, it may be seen that prediction accuracy according to the proposed scheme according to an embodiment of the present disclosure is higher than prediction accuracy according to the existing scheme.

Figure 4H:
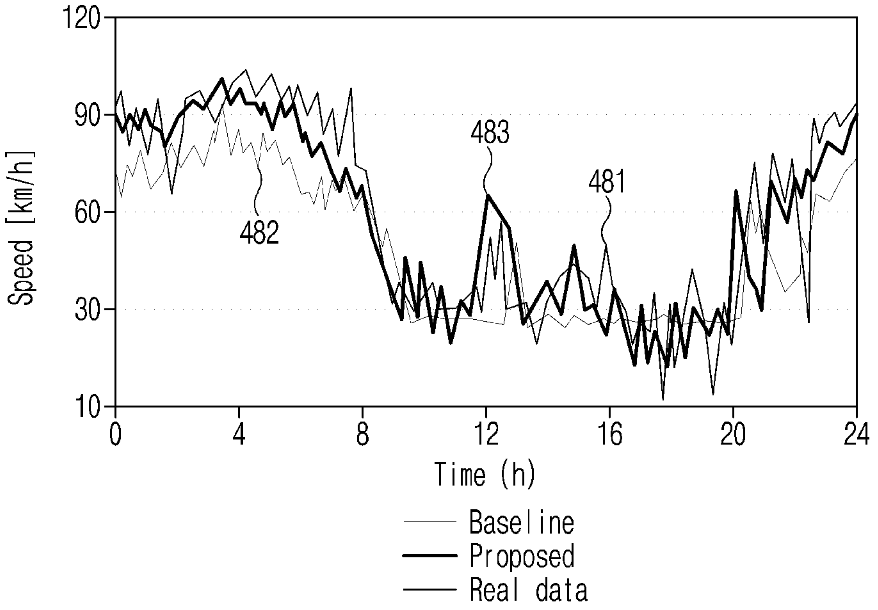
FIG. 4H is a drawing of another example indicating a qualitative analysis of performance of an apparatus for predicting traffic flow on a new road according to an embodiment of the present disclosure.

FIG. 4H is a drawing of another example indicating a qualitative analysis of performance of an apparatus for predicting traffic flow on a new road according to an embodiment of the present disclosure.

A graph shown in FIG. 4H illustrates the result of predicting traffic data corresponding to "a sleet weekday in winter (sleet & weekday & winter)" with respect to a new road in various schemes. Herein, reference numeral 481 indicates the real data, reference numeral 482 indicates the traffic data predicted by an existing scheme (e.g., baseline), and reference numeral 483 indicates the traffic data predicted by the apparatus for predicting the traffic flow on the new road according to an embodiment of the present disclosure.

It may be seen that the traffic data 483 predicted by the proposed scheme according to an embodiment of the present disclosure is more similar to the real data 481 than the traffic data 482 predicted by the existing scheme. For example, in conjunction with traffic flow around 6 a.m., the traffic data 483 predicted by the proposed scheme according to an embodiment of the present disclosure indicates that the vehicle travels at a high speed (e.g., the vehicle speed is greater than or equal to 110 km/h) to be similar to the real data 481, whereas the traffic data 482 predicted by the existing scheme indicates that the vehicle smoothly travels (e.g., the vehicle speed is 80 km/h) to be different from the real data 481. As a result, it may be seen that prediction accuracy according to the proposed scheme according to an embodiment of the present disclosure is higher than prediction accuracy according to the existing scheme.

FIG. 5A is a drawing of an example indicating a quantitative analysis of performance of an apparatus for predicting traffic flow on a new road according to an embodiment of the present disclosure.

As shown in FIG. 5A, a first table may include a first error between traffic data corresponding to "a sunny weekday in summer (sunny & weekday & summer)" predicted by a proposed scheme according to an embodiment of the present disclosure and real data, a second error between traffic data corresponding to "a sunny weekday in summer (sunny & weekday & summer)" predicted by an existing scheme (baseline) and the real data, and a performance improvement factor of the proposed scheme according to an embodiment of the present disclosure according to the first error compared to the second error. At this time, the error may be calculated by a mean absolute error (MAE) scheme, a root mean square error (RMSE) scheme, or a mean absolute percentage error (MAPE) scheme.

Such a first table may further include a first error between traffic data corresponding to "a day after a sunny holiday in summer (sunny & after holiday & summer)" predicted by the proposed scheme according to an embodiment of the present disclosure and the real data, a second error between traffic data corresponding to "a day after a sunny holiday in summer (sunny & after holiday & summer)" predicted by the existing scheme (baseline) and the real data, and a performance improvement factor of the proposed scheme according to an embodiment of the present disclosure according to the first error compared to the second error.

Such a first table may further include a first error between traffic data corresponding to "a sunny weekday in autumn (sunny & weekday & autumn)" predicted by the proposed scheme according to an embodiment of the present disclosure and the real data, a second error between traffic data corresponding to "a sunny weekday in autumn (sunny & weekday & autumn)" predicted by the existing scheme (baseline) and the real data, and a performance improvement factor of the proposed scheme according to an embodiment of the present disclosure according to the first error compared to the second error.

Such a first table may further include a first error between traffic data corresponding to "a day before a rainy holiday in autumn (rainy & before holiday & autumn)" predicted by the proposed scheme according to an embodiment of the present disclosure and the real data, a second error between traffic data corresponding to "a day before a rainy holiday in autumn (rainy & before holiday & autumn)" predicted by the existing scheme (baseline) and the real data, and a performance improvement factor of the proposed scheme according to an embodiment of the present disclosure according to the first error compared to the second error.

Such a first table may further include a first error between traffic data corresponding to "a sunny holiday in autumn (sunny & holiday & autumn)" predicted by the proposed scheme according to an embodiment of the present disclosure and the real data, a second error between traffic data corresponding to "a sunny holiday in autumn (sunny & holiday & autumn)" predicted by the existing scheme (baseline) and the real data, and a performance improvement factor of the proposed scheme according to an embodiment of the present disclosure according to the first error compared to the second error.

Such a first table may further include a first error between traffic data corresponding to "a sunny holiday season in autumn (sunny & holiday season & autumn)" predicted by the proposed scheme according to an embodiment of the present disclosure and the real data, a second error between traffic data corresponding to "a sunny holiday season in autumn (sunny & holiday season & autumn)" predicted by the existing scheme (baseline) and the real data, and a performance improvement factor of the proposed scheme according to an embodiment of the present disclosure according to the first error compared to the second error.

FIG. 5B is a drawing of another example indicating a quantitative analysis of performance of an apparatus for predicting traffic flow on a new road according to an embodiment of the present disclosure.

As shown in FIG. 5B, a second table may include a first error between traffic data corresponding to "a sunny weekday in spring (sunny & weekday & spring)" predicted by a proposed scheme according to an embodiment of the present disclosure and real data, a second error between traffic data corresponding to "a sunny weekday in spring (sunny & weekday & spring)" predicted by an existing scheme (baseline) and the real data, and a performance improvement factor of the proposed scheme according to an embodiment of the present disclosure according to the first error compared to the second error. At this time, the error may be calculated by a mean absolute error (MAE) scheme, a root mean square error (RMSE) scheme, or a mean absolute percentage error (MAPE) scheme.

Such a first table may further include a first error between traffic data corresponding to "a sunny holiday in spring (sunny & holiday & spring)" predicted by the proposed scheme according to an embodiment of the present disclosure and the real data, a second error between traffic data corresponding to "a sunny holiday in spring (sunny & holiday & spring)" predicted by the existing scheme (baseline) and the real data, and a performance improvement factor of the proposed scheme according to an embodiment of the present disclosure according to the first error compared to the second error.

Such a first table may include a first error between traffic data corresponding to "a sunny holiday season in spring (sunny & holiday season & spring)" predicted by the proposed scheme according to an embodiment of the present disclosure and the real data, a second error between traffic data corresponding to "a sunny holiday season in spring (sunny & holiday season & spring)" predicted by the existing scheme (baseline) and the real data, and a performance improvement factor of the proposed scheme according to an embodiment of the present disclosure according to the first error compared to the second error.

Such a second table may include a first error between traffic data corresponding to "a rainy holiday in spring (rainy & holiday & spring)" predicted by the proposed scheme according to an embodiment of the present disclosure and the real data, a second error between traffic data corresponding to "a rainy holiday in spring (rainy & holiday & spring)" predicted by the existing scheme (baseline) and the real data, and a performance improvement factor of the proposed scheme according to an embodiment of the present disclosure according to the first error compared to the second error.

Such a second table may include a first error between traffic data corresponding to "a snowy weekday in winter (snowy & weekday & winter)" predicted by the proposed scheme according to an embodiment of the present disclosure and the real data, a second error between traffic data corresponding to "a snowy weekday in winter (snowy & weekday & winter)" predicted by the existing scheme (baseline) and the real data, and a performance improvement factor of the proposed scheme according to an embodiment of the present disclosure according to the first error compared to the second error.

Such a second table may include a first error between traffic data corresponding to "a sleet weekday in winter (sleet & weekday & winter)" predicted by the proposed scheme according to an embodiment of the present disclosure and the real data, a second error between traffic data corresponding to "a sleet weekday in winter (sleet & weekday & winter)" predicted by the existing scheme (baseline) and the real data, and a performance improvement factor of the proposed scheme according to an embodiment of the present disclosure according to the first error compared to the second error.

Figure 6:
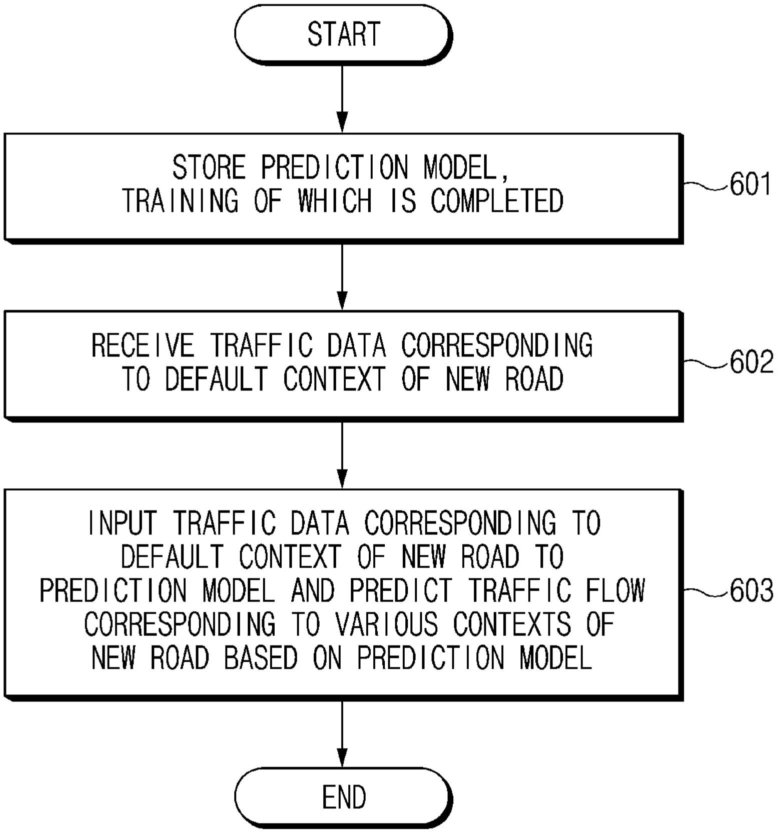
FIG. 6 is a flowchart illustrating a method for predicting traffic flow on a new road according to an embodiment of the present disclosure.

FIG. 6 is a flowchart illustrating a method for predicting traffic flow on a new road according to an embodiment of the present disclosure.

First of all, in operation 601, the memory 10 of FIG. 1 may store a prediction model, training of which is completed.

In operation 602, an input device 20 of FIG. 1 may receive traffic data corresponding to a default context of the new road.

In operation 603, a controller 40 of FIG. 1 may input the traffic data corresponding to the default context of the new road to the prediction model and may predict traffic flow corresponding to various contexts of the new road based on the prediction model.

Figure 7:
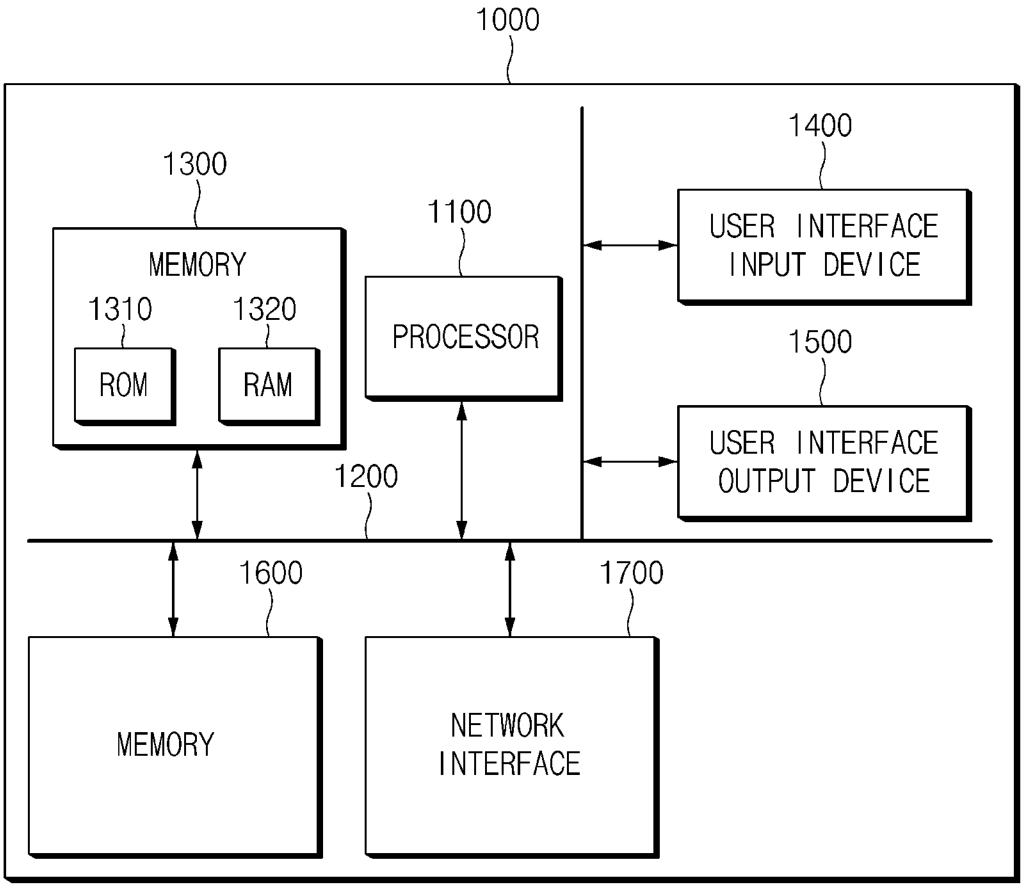
FIG. 7 is a block diagram illustrating a computing system for executing a method for predicting traffic flow on a new road according to an embodiment of the present disclosure.

FIG. 7 is a block diagram illustrating a computing system for executing a method for predicting traffic flow on a new road according to an embodiment of the present disclosure.

Referring to FIG. 7, the above-mentioned method for predicting the traffic flow on the new road according to an embodiment of the present disclosure may be implemented by means of the computing system. A computing system 1000 may include at least one processor 1100, a memory 1300, a user interface input device 1400, a user interface output device 1500, a memory (i.e., a storage) 1600, and a network interface 1700, which are connected with each other via a system bus 1200.

The processor 1100 may be a central processing unit (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the memory 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The apparatus for predicting the traffic flow on the new road and the method thereof may be provided to train a prediction model using traffic data corresponding to various contexts of existing roads and input traffic data corresponding to a default context (e.g., a sunny weekday) of the new road to the prediction model, the training of which is completed, to predict traffic flow corresponding to various contexts of the new road, thus predicting traffic flow for the new road where it is unable to collect historical traffic data.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for predicting traffic flow on a new road, the apparatus comprising:

a memory;

an input device; and a controller configured to:

provide training traffic data corresponding to various existing road contexts of an existing road received by the input device to a prediction model;

train, using the training traffic data and the various existing road contexts, the prediction model to capture a pattern of how traffic flows of the existing road change in conjunction with the various existing road contexts of the existing road;

incorporate the pattern into the prediction model as a change pattern;

perform additional training of the prediction model and the change pattern to discern various unique characteristics, each corresponding to a separate one of the various existing road contexts;

input traffic data corresponding to a default context of the new road received by the input device to the prediction model stored in the memory, training of which is completed; and predict a traffic flow corresponding to various new road contexts of the new road based on the prediction model, the change pattern, and the various unique characteristics.

2. The apparatus of claim 1, wherein the controller is further configured to control the prediction model to train the change pattern of traffic data according to a context based on first training data and second training data, in response to the input device receiving the first training data comprising first traffic data corresponding to a first context and the second training data comprising second traffic data corresponding to a second context.

3. The apparatus of claim 2, wherein the controller is further configured to control the prediction model to train the change pattern of the traffic data according to the context, in a process of generating fake data comprising the first traffic data corresponding to the second context.

4. The apparatus of claim 3, wherein the controller is further configured to control an auxiliary loss function of the prediction model to generate the first traffic data in which a unique characteristic of the second context is reflected.

5. The apparatus of claim 3, wherein the controller is further configured to control a reconstruction loss function of the prediction model to generate the fake data similar to real data.

6. The apparatus of claim 1, wherein the various existing road contexts comprise rain and snow as weather conditions, a weekday, a weekend, a holiday, a day before the holiday, and a day after the holiday as day types, spring, summer, autumn, and winter as seasons, or a combination thereof.

7. The apparatus of claim 1, wherein the training traffic data comprises an average of vehicle speeds recorded at intervals of a predetermined time.

8. The apparatus of claim 1, wherein the prediction model comprises a conditional generative adversarial network.

9. A method for predicting traffic flow on a new road, the method comprising:

providing, to a prediction model, training traffic data corresponding to various existing road contexts of an existing road;

train, using the training traffic data and the various existing road contexts, the prediction model to capture a pattern of how traffic flows of the existing road change in conjunction with the various existing road contexts of the existing road;

incorporating the pattern into the prediction model as a change pattern;

performing additional training of the prediction model and the change pattern to discern various unique characteristics, each corresponding to a separate one of the various existing road contexts;

storing, by memory, the prediction model, training of which is completed;

receiving, by an input device, traffic data corresponding to a default context of the new road;

inputting, by a controller, the traffic data corresponding to the default context of the new road to the prediction model; and predicting, by the controller, a traffic flow corresponding to various new road contexts of the new road based on the prediction model, the change pattern, and the various unique characteristics.

10. The method of claim 9, further comprising:

controlling, by the controller, the prediction model to train the change pattern of traffic data according to a context based on first training data and second training data, in response to receiving the first training data comprising first traffic data corresponding to a first context and the second training data comprising second traffic data corresponding to a second context.

11. The method of claim 10, wherein controlling the prediction model comprises training the change pattern of the traffic data according to the context, in a process where the prediction model generates fake data comprising the first traffic data corresponding to the second context.

12. The method of claim 11, wherein training the change pattern of the traffic data according to the context comprises controlling, by the controller, an auxiliary loss function of the prediction model to generate the first traffic data in which a unique characteristic of the second context is reflected.

13. The method of claim 11, wherein training the change pattern of the traffic data according to the context comprises controlling, by the controller, a reconstruction loss function of the prediction model to generate the fake data similar to real data.

14. The method of claim 9, wherein the various existing road contexts comprise rain and snow as weather conditions, a weekday, a weekend, a holiday, a day before the holiday, and a day after the holiday as day types, spring, summer, autumn, and winter as seasons, or a combination thereof.

15. The method of claim 9, wherein the traffic data comprises an average of vehicle speeds recorded at intervals of a predetermined time.

16. The method of claim 9, wherein the prediction model comprises a conditional generative adversarial network.

17. A method for predicting traffic flow on a new road, the method comprising:

obtaining first training data comprising first traffic data and first traffic context data;

obtaining second training data comprising second traffic data and second traffic context data, wherein the first training data and the second training data correspond to an existing road;

performing initial training of a prediction model using the first training data and the second training data to obtain a traffic change pattern;

generating, based at least in part on the first traffic data, the second traffic context data, and the traffic change pattern, fake traffic flow data;

analyzing, by a discriminator of the prediction model, the fake traffic flow data to obtain a unique context characteristic of a second traffic context corresponding to the second context traffic data;

setting an auxiliary loss function for the prediction model based at least in part on the fake traffic flow data;

setting a reconstruction loss function for the prediction model based at least in part on the second traffic context data and a unique existing road characteristic corresponding to the existing road;

receiving input data corresponding to the new road and comprising new road traffic data and new road default context data, wherein the new road default context data corresponds to a particular context of the new road; and providing the input data to the prediction model to obtain a set of outputs comprising new road traffic flow data for a set of new road traffic contexts other than the particular context, wherein the new road traffic flow data is obtained based at least in part on the auxiliary loss function and the reconstruction loss function.

* * * * *